United States Patent [19]
Yogo et al.

[11] Patent Number: 5,261,731
[45] Date of Patent: Nov. 16, 1993

[54] ABS PROPORTIONAL VALVE CAPABLE OF REMAINING OPEN WHILE THE WHEEL CYLINDER DRAIN VALVE IS OPEN

[75] Inventors: Kazutoshi Yogo; Hideo Wakata, both of Nagoya; Hidemi Ikai, Kariya, all of Japan

[73] Assignee: Nippondenso Co., Ltd., Kariya, Japan

[21] Appl. No.: 725,086

[22] Filed: Jul. 3, 1991

[30] Foreign Application Priority Data

Jul. 3, 1990 [JP] Japan .................. 2-177141

[51] Int. Cl.$^5$ .............................................. B60T 8/36
[52] U.S. Cl. .................................. 303/116.1; 303/11;
303/119.2; 303/DIG. 4; 137/596.17;
251/129.02
[58] Field of Search .............. 303/11, 59, 61, 68,
303/84.1, 84.2, 116 R, 119 SV, DIG. 1, DIG. 2,
DIG. 3, DIG. 4, 116.1, 119.2; 137/596.17;
251/129.02, 129.08, 129.21

[56] References Cited

U.S. PATENT DOCUMENTS

| | | | |
|---|---|---|---|
| 3,402,972 | 9/1968 | Cooper et al. | 303/20 |
| 4,715,666 | 12/1987 | Farr | 303/116.4 |
| 4,842,343 | 6/1989 | Akiyoshi et al. | 303/95 X |
| 4,898,434 | 2/1990 | Kohno et al. | 303/119 SV |
| 4,915,459 | 4/1990 | Hashida | 303/119.2 |
| 4,919,497 | 4/1990 | Kaes | 303/119 SV |
| 5,076,538 | 12/1991 | Mohr et al. | 303/119 SV X |

FOREIGN PATENT DOCUMENTS

| | | | |
|---|---|---|---|
| 0361336 | 4/1990 | European Pat. Off. | 303/116 R |
| 2403770 | 8/1975 | Fed. Rep. of Germany | 137/596.17 |
| 51-6308 | 2/1976 | Japan . | |
| 0138455 | 8/1982 | Japan | 303/119 SV |
| 0082865 | 4/1988 | Japan | 303/116 R |
| 0132449 | 5/1989 | Japan | 303/119 SV |

*Primary Examiner*—Robert J. Oberleitner
*Assistant Examiner*—Josie A. Ballato
*Attorney, Agent, or Firm*—Cushman, Darby & Cushman

[57] ABSTRACT

In a braking pressure control apparatus for a vehicle, a first valve connected between a hydraulic pressure source and a wheel cylinder serves to permit and inhibit a supply of brake fluid to the wheel cylinder from the hydraulic pressure source. A second valve connected between the wheel cylinder and a reservoir serves to permit and inhibit an escape of the brake fluid from the wheel cylinder toward the reservoir. A control device serves to output control signals to the first and second valves respectively to control the braking pressure in the wheel cylinder in response to a detected running condition of the vehicle. The control device includes a deciding section for deciding whether or not a small variation in the braking pressure in the wheel cylinder should be done on the basis of the detected running condition of the vehicle, and an outputting section for, when the deciding section decides that the small variation in the braking pressure in the wheel cylinder should be done, simultaneously outputting the control signals to the first and second valves to simultaneously execute the supply of the brake fluid to the wheel cylinder and the escape of the brake fluid from the wheel cylinder.

7 Claims, 14 Drawing Sheets

ABS PROPORTIONAL VALVE CAPABLE OF REMAINING OPEN WHILE THE WHEEL CYLINDER DRAIN VALVE IS OPEN

BACKGROUND OF THE INVENTION

1. Field of the Invention

This invention relates to a braking pressure control apparatus for a vehicle such as an automotive vehicle.

2. Description of the Prior Art

In most of automotive antiskid control apparatuses, braking pressures applied to wheel cylinders within brake units are adjusted by electromagnetic valves which control the communication among the wheel cylinders, a master cylinder (a pressure source), and a reservoir.

Japanese published examined patent application 51-6308 discloses an antiskid control apparatus in which communication control electromagnetic valves are driven by pulse currents, and thus the rates of increases and decreases in braking pressures applied to wheel cylinders are variable in response to the duty cycles of the drive pulse currents. The antiskid control apparatus of Japanese patent application 51-6308 can realize gradual increases and decreases in the braking pressures.

The antiskid control apparatus of Japanese patent application 51-6308 has the following problem. The response characteristics of the electromagnetic valves considerably limit the minimal value of a variable range of the duty cycles of the drive pulse currents. As a result, fine adjustment of the braking pressures tends to be difficult under certain conditions.

SUMMARY OF THE INVENTION

It is an object of this invention to provide an improved braking pressure control apparatus.

A first aspect of this invention provides a braking pressure control apparatus for a vehicle which comprises a hydraulic pressure source; a first valve connected between the hydraulic pressure source and a wheel cylinder for permitting and inhibiting a supply of brake fluid to the wheel cylinder from the hydraulic pressure source; a reservoir; a second valve connected between the wheel cylinder and the reservoir for permitting and inhibiting an escape of the brake fluid from the wheel cylinder toward the reservoir; and control means for outputting control signals to the first and second valves respectively to control the braking pressure in the wheel cylinder in response to a detected running condition of the vehicle; wherein the control means comprises deciding means for deciding whether or not a small variation in the braking pressure in the wheel cylinder should be done on the basis of the detected running condition of the vehicle, and outputting means for, when the deciding means decides that the small variation in the braking pressure in the wheel cylinder should be done, simultaneously outputting the control signals to the first and second valves to simultaneously execute the supply of the brake fluid to the wheel cylinder and the escape of the brake fluid from the wheel cylinder.

A second aspect of this invention provides a braking pressure control apparatus for a vehicle which comprises a hydraulic pressure source; a first valve connected between the hydraulic pressure source and a wheel cylinder for adjusting a supply of brake fluid to the wheel cylinder from the hydraulic pressure source; a reservoir; a second valve connected between the wheel cylinder and the reservoir for adjusting an escape of the brake fluid from the wheel cylinder toward the reservoir; and control means for outputting control signals to the first and second valves respectively to control the braking pressure in the wheel cylinder in response to a detected running condition of the vehicle; wherein one of the first and second valves comprises a proportional electromagnetic valve for continuously varying the braking pressure in the wheel cylinder in accordance with a level of a current of the related control signal so that both a quantity of an increase and a quantity of a decrease in the braking pressure in the wheel cylinder can be continuously varied.

DESCRIPTION OF THE FIRST PREFERRED EMBODIMENT

Figure 1:
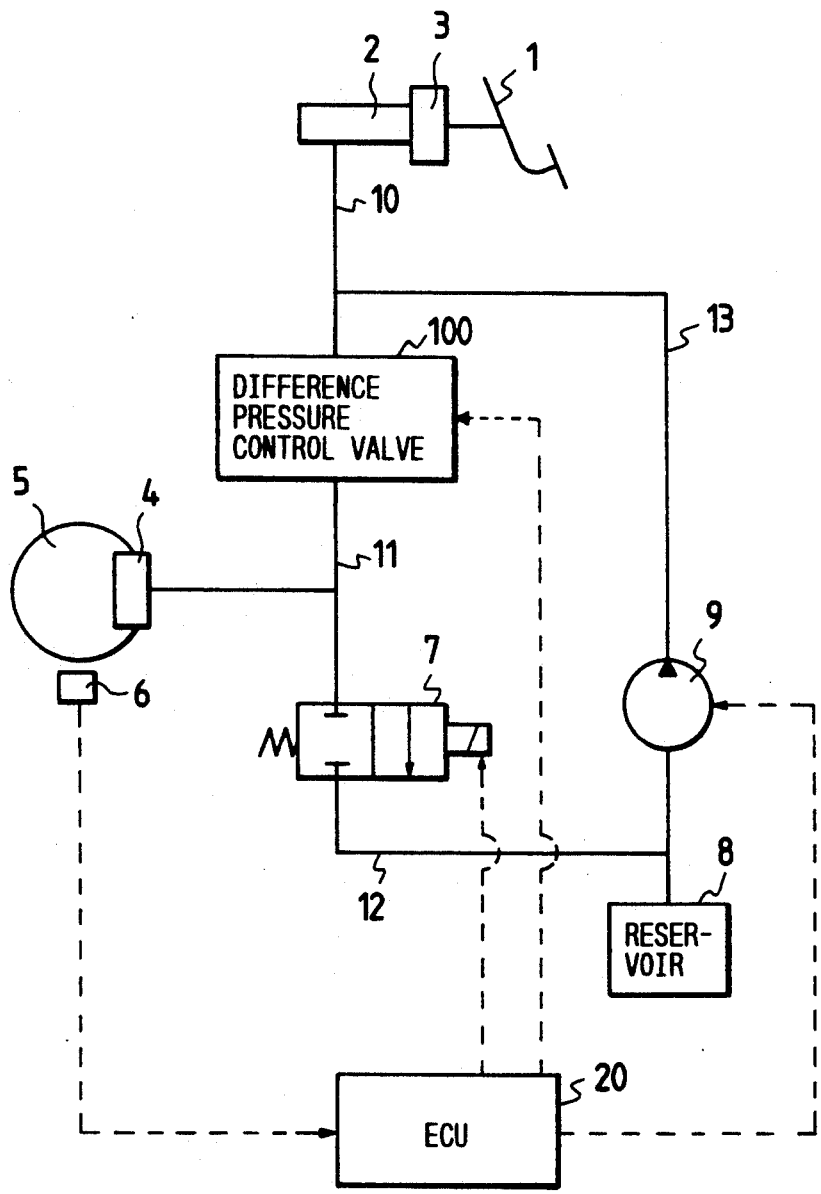
FIG. 1 is a diagram of a braking pressure control apparatus according to a first and fifth embodiment of this invention.

With reference to FIG. 1, a hydraulic master cylinder 2 is activated in response to a brake pedal 1 via a brake booster 3. The master cylinder 2 is connected to a difference pressure control electromagnetic valve (an electrically-driven valve or a solenoid valve) 100 and the outlet of an electric pump 9 via pipes 10 and 13. The pump 9 serves to generate a hydraulic pressure. The difference pressure control valve 100 is connected to a hydraulic wheel cylinder 4 within a brake unit and an electromagnetic change valve (an electrically-driven valve or a solenoid valve) 7 via pipes 11. The wheel cylinder 4 is associated with a vehicle wheel 5. The change valve 7 is connected to a reservoir 8 via a pipe 12. The inlet of the pump 9 is also connected to the reservoir 8.

When the difference pressure control valve 100 is open, the pressures developed by the master cylinder 2 and the pump 9 are transmitted to the wheel cylinder 4 so that the braking pressure applied to the wheel cylinder 4 can increase. When the difference pressure control valve 100 is closed, the transmission of the pressures from the master cylinder 2 and the pump 9 to the wheel cylinder 4 is inhibited so that the braking pressure applied to the wheel cylinder 4 can decrease or remain essentially fixed. When the change valve 7 is open, brake fluid escapes from the wheel cylinder 4 toward the reservoir 8 so that the braking pressure applied to the wheel cylinder 4 can decrease. When the change valve 7 is closed, the escape of the brake fluid from the wheel cylinder 4 toward the reservoir 8 is inhibited so that the braking pressure applied to the wheel cylinder 4 can remain essentially fixed. In this way, the braking pressure applied to the wheel cylinder 4 can be adjusted by the difference pressure control valve 100 and the change valve 7. Furthermore, as will be shown later, the specific design of the difference pressure control valve allows for smoother transitions between adjustments and finer control in the braking pressure by the braking pressure control apparatus.

The difference pressure control valve 100 is of such a type that the pressure across the valve 100 is continuously varied in accordance with the level of a drive current fed to the valve 100. The difference pressure control valve 100 is normally open. On the other hand, the change valve 7 is of an ON-OFF type, being changeable between a closed position and an open position. In addition, the change valve 7 is normally closed. As will be explained later, under certain conditions, the change valve 7 is driven by a pulse current having a variable duty cycle. From the viewpoint of a time average, the degree of opening of the change valve 7 is varied in accordance with the duty cycle of the drive pulse current. Thus, the braking pressure applied to the wheel cylinder 4 can be continuously varied in accordance with the level of the drive current to the difference pressure control valve 100 and the duty cycle of the drive pulse current to the change valve 7. Specifically, the electromagnetic valve 100 serves to control the difference $\Delta P$ between a master cylinder pressure PM and a wheel cylinder pressure PW, where the master cylinder pressure PM is defined as the resultant of the pressures developed by the master cylinder 2 and the pump 9, and the wheel cylinder pressure PW is defined as a pressure applied to the wheel cylinder 4 (the braking pressure applied to the wheel cylinder 4).

A speed sensor 6 associated with the vehicle wheel 5 senses the rotational speed of the vehicle wheel 5. The speed sensor 6 is electrically connected to an electronic control unit (ECU) 20 so that a vehicle wheel speed signal is outputted from the speed sensor 6 to the ECU 20. The ECU 20 detects lock conditions of the vehicle wheel 5 on the basis of the vehicle wheel speed signal. The ECU 20 is electrically connected to the difference pressure control valve 100, the change valve 7, and the pump 9. The ECU 20 generates drive signals for the difference pressure control valve 100, the change valve 7, and the pump 9 in response to the detected lock conditions of the vehicle wheel 5. The generated drive signals are fed from the ECU 20 to the difference pressure control valve 100, the change valve 7, and the pump 9 respectively.

It should be noted that FIG. 1 shows only one vehicle wheel, and there are three other vehicle wheels in the case of a 4-wheel vehicle. A given part of the arrangement of FIG. 1 is also provided for each of the other vehicle wheels. Thus, the control of the braking pressure is executed for each of the vehicle wheels.

Figure 2:
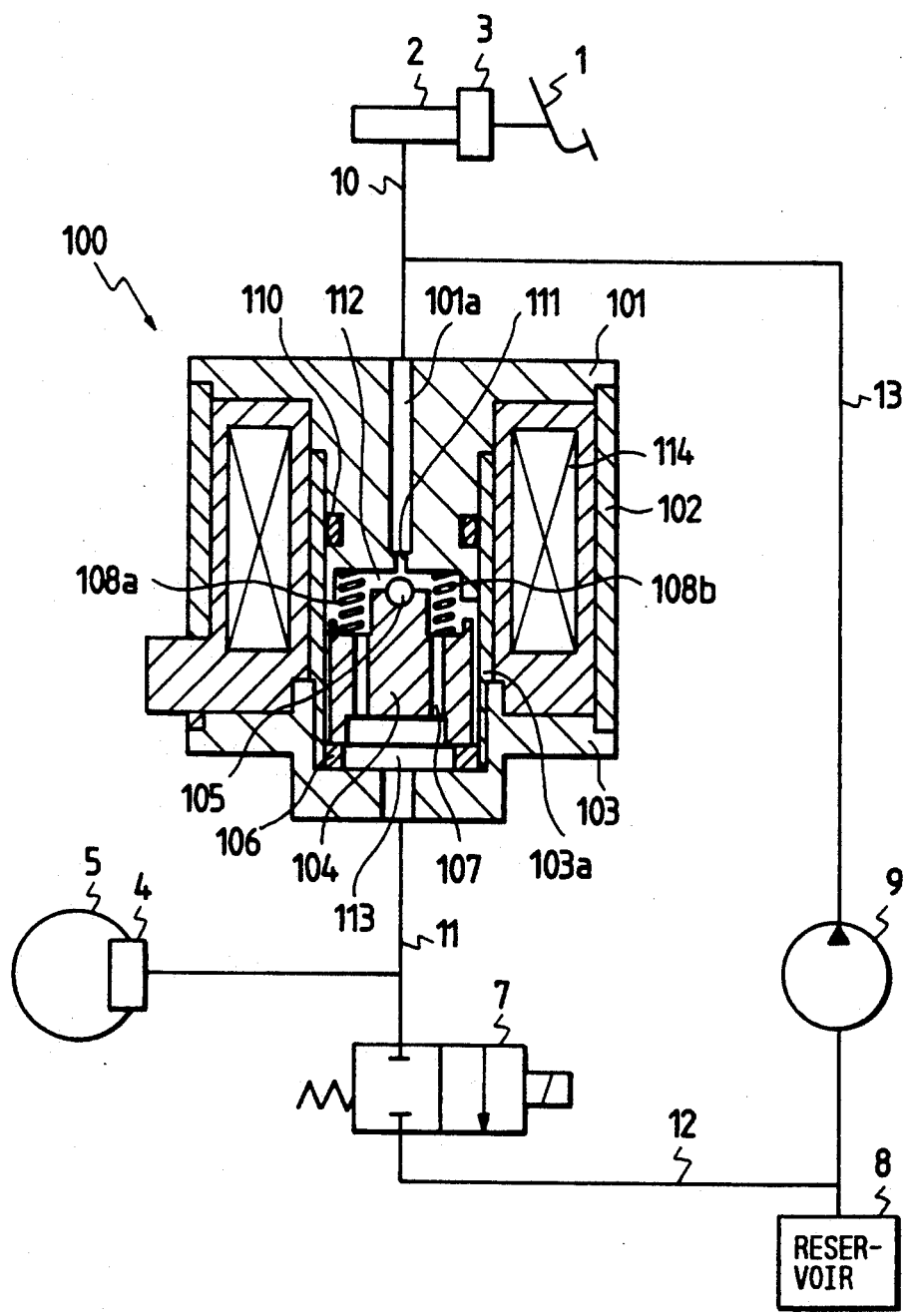
FIG. 2 is a diagram including a sectional view of the difference pressure control valve of FIG. 1.

As shown in FIG. 2, the difference pressure control valve 100 includes a core 101, a yoke 102, a plate 103, an armature 104, a cylindrical member 103a, a washer 106, and a winding 114. The core 101 is made of magnetic material. The core 101 extends into the cylindrical member 103a. A sealing ring 110 is provided between the core 101 and the cylindrical member 103a. The cylindrical member 103a is fixed to the plate 103, and is made of non-magnetic material. The washer 106 is made of non-magnetic material. The winding 114 is held within a resin mold. The armature 104 is movably disposed within the cylindrical member 103a. When the winding 114 is energized, the armature 104 is moved toward the core 101 with a force proportional to the magnitude of current used to energize the winding, so that a valve ball 105 fixed on the armature 104 comes into contact with a valve seat 111 formed on the core 101. As a result, the communication between a passage 101a and a chamber 112 is blocked. The passage 101a leads from the pipe 10. On the other hand, when the winding 114 is de-energized, the armature 104 is moved away from the core 101 by return springs 108a and 108b so that the valve ball 105 separates from the valve seat 111. As a result, the passage 101a and the chamber 112 are made into communication with each other. In this case, the armature 104 can be moved until the armature 104 encounters the washer 106. The chamber 112 communicates with a chamber 113 via passages 107 extending through the armature 104. The chamber 113 leads to the pipes 11.

During a normal braking process, the ECU 20 does not output any active drive signals to the difference pressure control valve 100 and the change valve 7. Therefore, the difference pressure control valve 100 remains fully opened so that the master cylinder 2, the pump 9, and the wheel cylinder 4 are in full communication with each other. In addition, the change valve 7 remains in its closed position so that the communication between the wheel cylinder 4 and the reservoir 8 keeps blocked. In this case, the master cylinder pressure PM, which is generated in response to the depression of the brake pedal 1, is transmitted to the wheel cylinder 4 via the pipe 10, the difference pressure control valve 100, and the pipe 11 without undergoing an damping effect in the difference pressure control valve 100.

When the degree of the lock of the vehicle wheel 5 increases as a result of the braking process, the ECU 20 starts an antiskid control process. During the antiskid control process, the ECU 20 operates to adjust the wheel cylinder pressure PW by controlling the difference pressure control valve 100 and the change valve 7.

An increase in the wheel cylinder pressure PW which occurs during the antiskid control process is executed by controlling the level of the drive current to the difference pressure control valve 100. During the increase in the wheel cylinder pressure PW, the ECU 20 does not output any active drive signal to the change valve 7 so that the change valve 7 remains closed.

Figure 3:
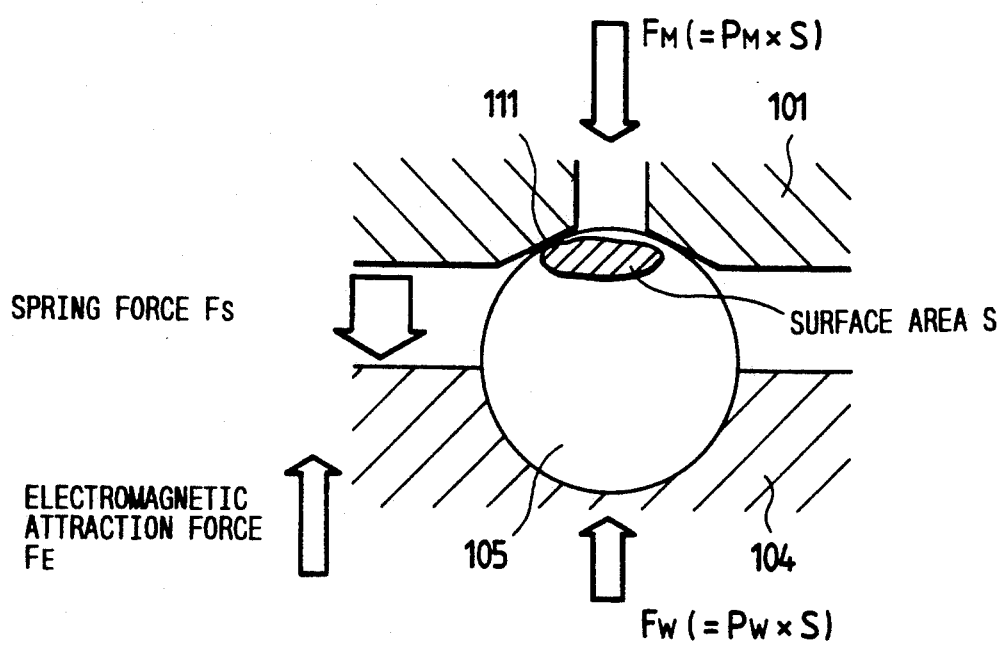
FIG. 3 is a sectional view of a part of the difference pressure control valve of FIG. 2.

A detailed description will be given of the operation of the difference pressure control valve 100 with reference to FIG. 3. When the winding 114 within the difference pressure control valve 100 is supplied with a drive current from the ECU 20 so that the winding 114 is energized, an electromagnetic attraction force FE is generated in the direction of moving the valve ball 105 on the armature 104 toward the valve seat 111 on the core 101 as shown in FIG. 3. The armature 104 is subjected to three forces FS, FM, and FW other than the electromagnetic attraction force FE as shown in FIG. 3. The first force FS is exerted by the return springs 108a and 108b in the direction of moving the valve ball 105 away from the valve seat 111. The second force FM is caused by the master cylinder pressure PM in the direction of moving the valve ball 105 away from the valve seat 111. The second force FM is given as FM=PM×S, where S denotes the area of the part of the valve seat 111 which is subjected to the master cylinder pressure PM when the valve ball 105 contacts with the valve seat 111. The third force FW is caused by the wheel cylinder pressure PW in the direction of moving the valve ball 105 toward the valve seat 111. The third force FW is given as FW=PW×S.

When the forces FE, FS, FM, and FW exerted on the armature 104 balance, the valve ball 105 contacts with the valve seat 111. At this moment, the master cylinder pressure PM and the wheel cylinder pressure PW move into steady states. Under these balanced conditions, the relation among the forces FE, FS, FM, and FW is given as the following equation.

$$FM + FS = FW + FE \quad (1)$$

By referring to the equation (1), the relation between the force FM and the master cylinder pressure PM, and the relation between the force FW and the wheel cylinder pressure PW, the difference ΔP between the master cylinder pressure PM and the wheel cylinder pressure PW is given by the following equation.

$$\Delta P = PM - PW = (FE - FS)/S \quad (2)$$

Figure 4:
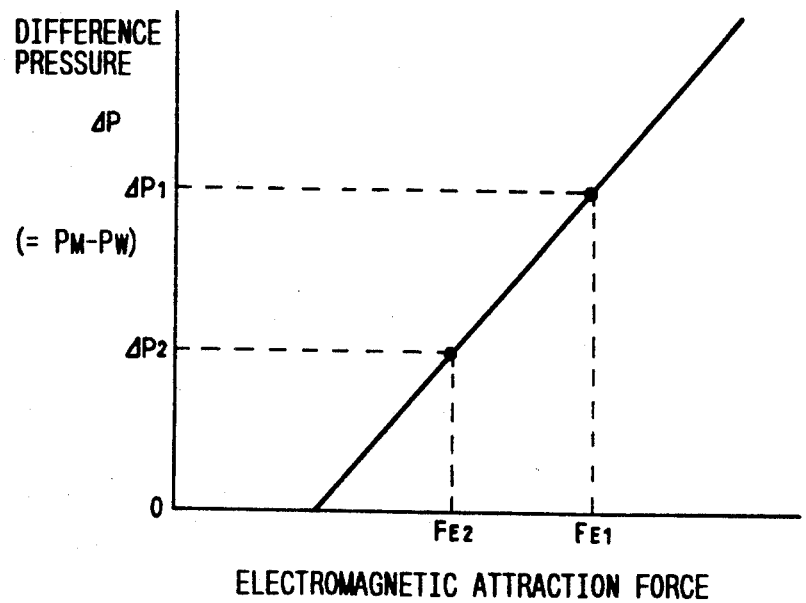
FIG. 4 is a diagram showing characteristics of the difference pressure control valve of FIGS. 1 and 2.

Since the spring force FS and the valve seat area S are constant, it is understood from the equation (2) that the difference ΔP between the master cylinder pressure PM and the wheel cylinder pressure PW can be continuously varied in accordance with the electromagnetic attraction force FE as shown in FIG. 4. This is all due to the simple balance of forces located within the difference pressure control valve 100, and their natural tendency to reach an equilibrium state. Keeping in mind that the spring force FS is constant, it is seen that any two of the forces FM, FE and FW will compensate for any changes in the third force in order to retain an equilibrium state. In the current embodiment, the force FM is balanced out by the forces FE and FW. Thus, with the master cylinder pressure and the force it causes, FM, used as a reference, any changes in the equilibrium state caused by varying the force FE will result in a compensation by force FW. Furthermore, the electromagnetic attraction force FE is proportional to the drive current fed to the winding 114. Thus, the difference ΔP between the master cylinder pressure PM and the wheel cylinder pressure PW can be continuously adjusted by controlling the level of the drive current to the winding 114. This design, therefore, allows for smoother transitions and finer adjustments of the braking pressure applied to the wheel cylinders by the variation of drive current supplied by the electronic control unit (ECU) 20.

Figure 5:
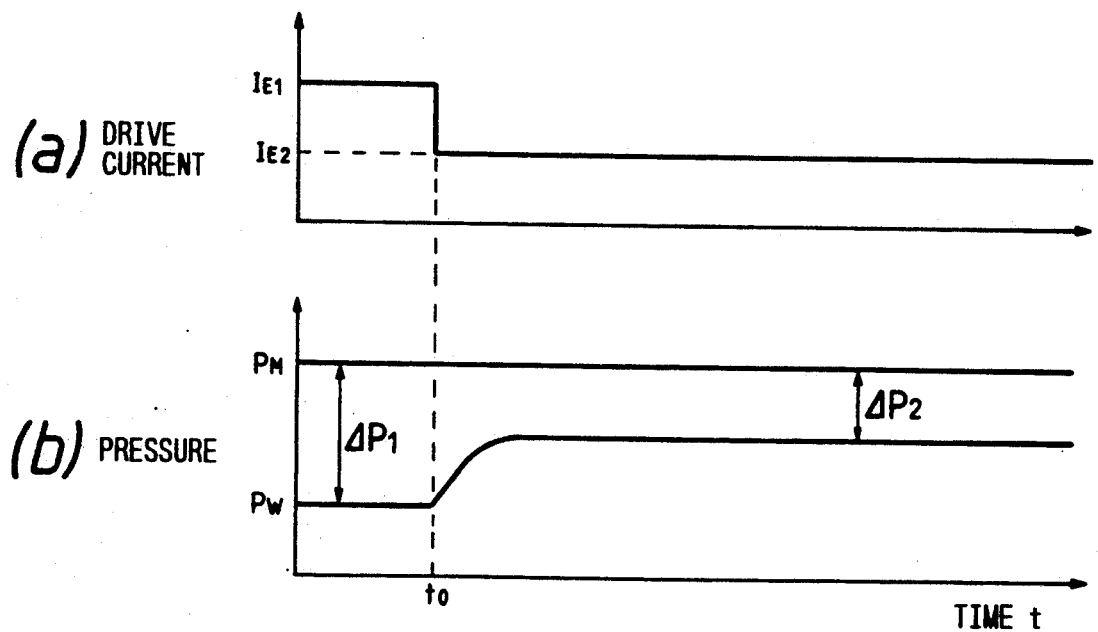
FIG. 5 is a timing chart showing variations in a drive current and pressures related to the difference pressure control valve of FIGS. 1 and 2.

A description will be given of an increase in the braking pressure which is executed during the antiskid control process. It is now assumed that the pressure difference ΔP is equal to a value ΔP1 when the drive current to the winding 114 assumes a level IE1 and thus the electromagnetic attraction force FE equals a value FE1 as shown in FIG. 4. A consideration will now be given of the case where the drive current is decreased from the level IE1 to a level IE2 so that the electromagnetic attraction force FE is reduced from the value FE1 to a value FE2 at a moment t0 as shown in FIG. 5. The decrease in the level of the drive current unbalances the forces FE, FS, FM, and FW exerted on the armature 104, so that the resultant force urging the armature 104 away from the valve seat 111 becomes dominant. As a result, the valve ball 105 separates from the valve seat 111, and the difference pressure control valve 100 is opened. Thus, the brake fluid is driven into the wheel cylinder 4 via the difference pressure control valve 100 so that the braking pressure, that is, the wheel cylinder pressure PW rises as shown in FIG. 5. As the wheel cylinder pressure PW rises, the related force FW is stronger and the pressure difference ΔP drops. When the pressure difference ΔP reaches a value ΔP2 corresponding to the electromagnetic attraction force FE2 (see FIG. 4), that is, when the wheel cylinder pressure PW reaches a value "PM−ΔP2", the forces FE, FS, FM, and FW exerted on the armature 104 balance and the valve ball 105 is moved into contact with the valve seat 111. Thus, the difference pressure control valve 100 is closed, and the wheel cylinder pressure PW is held at the value "PM−ΔP2".

The sum K of the spring constants Ka and Kb of the return springs 108a and 108b is chosen so as to be greater than the rate of a variation in the electromagnetic attraction force FE with respect to the stroke of the armature 104. Therefore, in the case where the difference ΔP between the master cylinder pressure PM and the wheel cylinder pressure PW moves toward the level ΔP corresponding to the electromagnetic attraction force FE2, the valve ball 105 moves toward the valve seat 111 at a slower rate as the pressure difference ΔP is closer to the level ΔP. As a result, the degree of opening of the difference pressure control valve 100 which is determined by the spacing between the valve ball 105 and the valve seat 111 is gradually decreased, and the wheel cylinder pressure PW is smoothly increased as shown in FIG. 5.

As described previously, the ECU 20 can realize a smooth increase in the wheel cylinder pressure PW by decreasing the drive current IE to the difference pressure control valve 100 while keeping the change valve 7 de-energized. The degree or magnitude of this increase in the wheel cylinder pressure PW can be finely adjusted by controlling the drive current IE to the difference pressure control valve 100.

During the antiskid control process, when the wheel cylinder pressure PW is required to remain constant, the ECU 20 de-energizes the change valve 7 and keeps constant the drive current IE to the difference pressure control valve 100.

Figure 6:
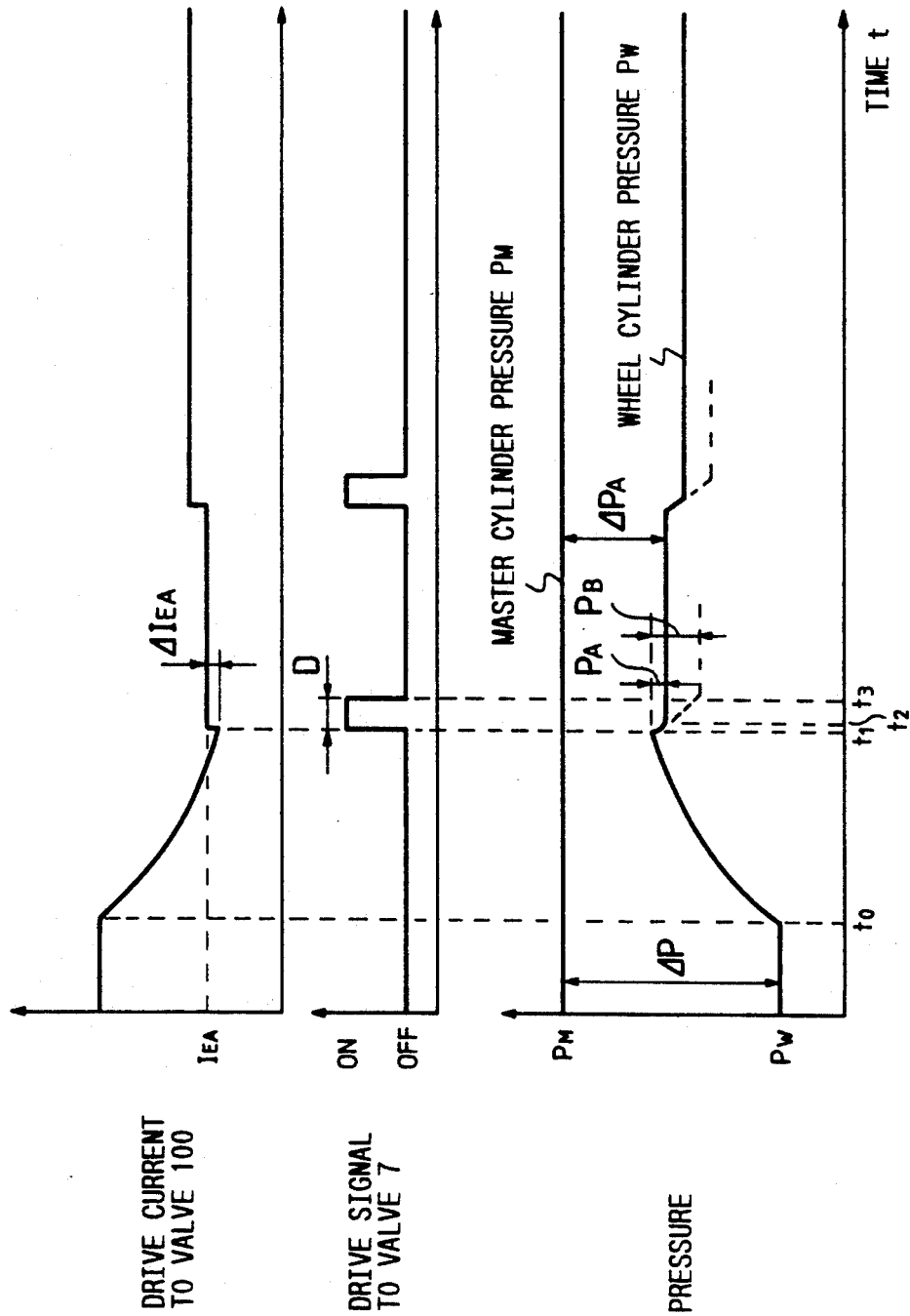
FIG. 6 is a timing chart showing variations in a drive current to the difference pressure control valve, a drive signal to the change valve, a master cylinder pressure, and a wheel cylinder pressure in the apparatus of FIG. 1.

A description will be given of a decrease in the braking pressure which is executed during the antiskid control process. During the antiskid control process, when a small decrease in the wheel cylinder pressure PW is required, the ECU 20 increases the drive current IE to the difference pressure control valve 100 and feeds a pulse drive current to the change valve 7. A further description will be given with reference to FIG. 6. It is now assumed that the drive current IE to the difference pressure control valve 100 remains fixed and also the wheel cylinder pressure PW keeps constant until a moment t0 as shown in FIG. 6. In addition, during an interval between the moment t0 and a moment t1, the ECU 20 decreases the drive current IE to the difference pressure control valve 100 so that the wheel cylinder pressure PW smoothly rises as shown in FIG. 6. In the case where the wheel cylinder pressure PW is required to be decreased by a pressure PA at the moment t1, the ECU 20 increases the drive current IE to the difference pressure control valve 100 by a value ΔIEA corresponding to the pressure PA and also starts to feed a pulse drive current to the change valve 7. As shown in FIG. 6, during an interval between the moment t1 and t3, the ECU 20 continues to energize the change valve 7 by feeding a pulse of the drive current, so that the change valve 7 is kept open and the wheel cylinder 4 is held in communication with the reservoir 8. Thus, the brake fluid escapes from the wheel cylinder 4 toward the reservoir 8 via the change valve 7, and the wheel cylinder pressure PW drops. At a moment t2 between the moments t1 and t3, the wheel cylinder pressure PW drops to a level which is lower than the last peak level by the pressure PA, and the difference between the master cylinder pressure PM and the wheel cylinder pressure PW becomes equal to a value ΔPA. At this moment t2, the decrease in the wheel cylinder pressure PW is completed. During the interval between the moments t2 and t3, if the brake fluid escapes from the wheel cylinder 4 toward the reservoir 8 and thus the wheel cylinder pressure PW further drops, the difference pressure control valve 100 is opened and the brake fluid is supplied to the wheel cylinder pressure PW. As a result, such a further drop in the wheel cylinder pressure PW is prevented, and thus the difference ΔP between the master cylinder pressure PM and the wheel cylinder pressure PW is essentially maintained at the level ΔPA. In other words, during the interval between the moments t2 and t3, the escape of the brake fluid from the wheel cylinder 4 via the change valve 7 and the supply of the brake fluid to the wheel cylinder 4 via the difference pressure control valve 100 can be performed simultaneously. Since the flow of the brake fluid which results from the simultaneous execution of the escape of the brake fluid from the wheel cylinder 4 and the supply of the brake fluid to the wheel cylinder 4 is essentially useless for positive adjustment of the wheel cylinder pressure PW, it is preferable that the interval between the moments t2 and t3 is short. Specifically, it is preferable that the width D (see FIG. 6) of a pulse of the drive current to the change valve 7 is slightly longer than the interval between the moments t1 and t2 which is spent to decrease the wheel cylinder pressure PW by the value PA.

During the antiskid control process, when a rapid and great decrease in the wheel cylinder pressure PW is required, the ECU 20 greatly increases the drive current IE to the difference pressure control valve 100 and feeds a pulse drive current to the change valve 7. In this case, the width of a pulse of the drive current to the change valve 7 is set relatively large.

Figure 7:
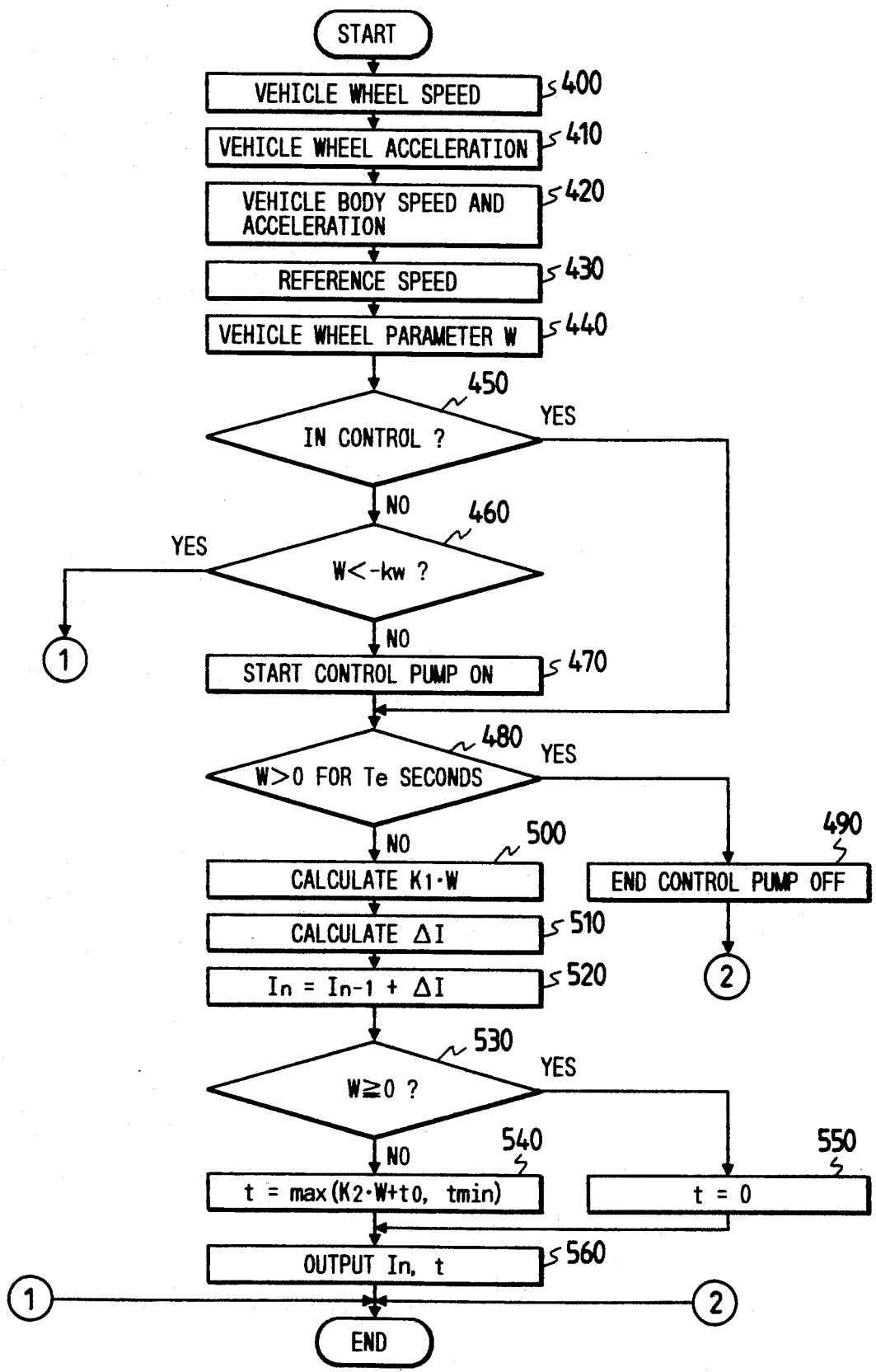
FIG. 7 is a flowchart of a program operating the ECU of FIG. 1.

The ECU 20 includes a microcomputer having a combination of a CPU, a ROM, a RAM, and an I/O circuit. The ECU 20 operates in accordance with a program stored in the ROM. FIG. 7 is a flowchart of the program which is periodically reiterated.

As shown in FIG. 7, a first step 400 of the program calculates a current vehicle wheel speed VW by referring to the output signal from the vehicle wheel sensor 6. A step 410 following the step 400 calculates a current vehicle wheel acceleration αW on the basis of the output signal from the vehicle wheel speed sensor 6. A step 420 following the step 410 estimates a current vehicle body speed Vb and a current vehicle body acceleration αb on the basis of the vehicle wheel speed VW and the vehicle wheel acceleration αW. A step 430 following the step 420 generates a reference speed Vs by multiplying the estimated vehicle body speed Vb by a predetermined constant set between 0.7 and 0.95. The reference speed Vs is used in estimating or deciding lock conditions of the vehicle wheel 5. A step 440 following the step 430 calculates a vehicle wheel parameter W representing the lock conditions of the vehicle wheel 5. Specifically, the vehicle wheel parameter W is determined by referring to the following equation.

$$W = A \cdot (VW - Vs) + B \cdot (\alpha W - \alpha b)$$

where A and B denote predetermined positive constants. The vehicle wheel parameter W which is equal to or greater than 0 represents that the vehicle wheel 5 is free from a lock. The vehicle wheel parameter W which is smaller than 0 represents that the vehicle wheel 5 is subjected to a lock. In this case, the absolute value of the vehicle wheel parameter W denotes the degree of the lock of the vehicle wheel 5.

A step 450 following the step 440 decides whether or not antiskid control is being performed. When the antiskid control is not being performed, the program advances to a step 460. When the antiskid control is being performed, the program jumps to a step 480. The step 460 decides whether or not the vehicle wheel parameter W is smaller than a control starting level -Kw. When the vehicle wheel parameter W is smaller than the control starting level -Kw, that is, when the vehicle wheel 5 is subjected to a lock, the program advances to a step 470 which activates the pump 9 to start the antiskid control. When the vehicle wheel parameter W is equal to or greater than the control starting level -Kw, that is, when the vehicle wheel 5 is free from a lock, the current execution cycle of the program is ended.

The step 480 decides whether or not the vehicle wheel parameter W has been greater than 0 for a predetermined interval Te of, for example, 0.5 to 2 seconds. When the vehicle wheel parameter W has been greater than 0 for the predetermined interval Te, that is, when the lock of the vehicle wheel 5 is removed, the program advances to a step 490 which deactivates the pump 9 to suspend the antiskid control. When the vehicle wheel parameter W has not been greater than 0 for the predetermined interval Te, that is, when the lock of the vehicle wheel 5 still continues, the program advances to a step 500. After the step 490, the current execution cycle of the program is ended. The step 500 calculates a desired pressure change value by multiplying the vehicle wheel parameter W by a predetermined coefficient K1. A step 510 following the step 500 calculates a desired current change value $\Delta I$ corresponding to the desired pressure change value by referring to the relation of FIG. 4. A step 520 following the step 510 updates a desired drive current to the difference pressure control valve 100 and specifically calculates a present desired drive current $I_n$ by adding the desired current change value $\Delta I$ to the preceding desired drive current $I_{n-1}$.

A step 530 following the step 520 compares the vehicle wheel parameter W with 0. When the vehicle wheel parameter W is equal to or greater than 0, the program advances to a step 550. Otherwise, the program advances to a step 540. The step 550 nullifies a desired width "t" of each pulse of the drive current to the change valve 7 and thereby continuously de-energizes the change valve 7 to hold or increase the wheel cylinder pressure PW. The step 540 determines the desired pulse width "t" of the drive current to the change valve 7 by referring to the following equation.

$$t = \max(K2 \cdot W + t0, tmin)$$

Specifically, the step 540 multiplies the vehicle wheel parameter W by a predetermined coefficient K2 and adds a predetermined offset interval t0 to the resultant of the multiplication, thereby calculating the value "K2·W+t0". In addition, the step 540 reads out a minimal pulse width "tmin" necessary for driving the change valve 7. Finally, the step 540 selects the greater of the value "K2·W+t0" and the value "tmin" as the desired pulse width "t". Accordingly, in the case where a lock of the vehicle wheel 5 occurs and thus the vehicle wheel parameter W becomes smaller than 0, a drive current having a pulse width equal to or greater than the minimal pulse width "tmin" is fed to the change valve 7 to reduce the wheel cylinder pressure PW. As the absolute value of the vehicle wheel parameter W increases, that is, as the degree of the lock of the vehicle wheel 5 increases, the desired pulse width "t" is lengthened to increase a decrease in the wheel cylinder pressure PW. After the steps 540 and 550, the program advances to a step 560 which outputs the desired present drive current $I_n$ calculated by the step 520 and which also outputs the desired pulse width "t" calculated by the step 540 or 550. Specifically, the step 560 sets the actual drive current and the actual pulse width equal to the desired drive current $I_n$ and the desired pulse width "t" respectively. As a result, the drive current having a level equal to the desired level $I_n$ is fed to the difference pressure control valve 100. In addition, the drive pulse having a pulse width equal to the desired width "t" is fed to the change valve 7. After the step 560, the current execution cycle of the program is ended.

DESCRIPTION OF THE SECOND PREFERRED EMBODIMENT

Figure 8:
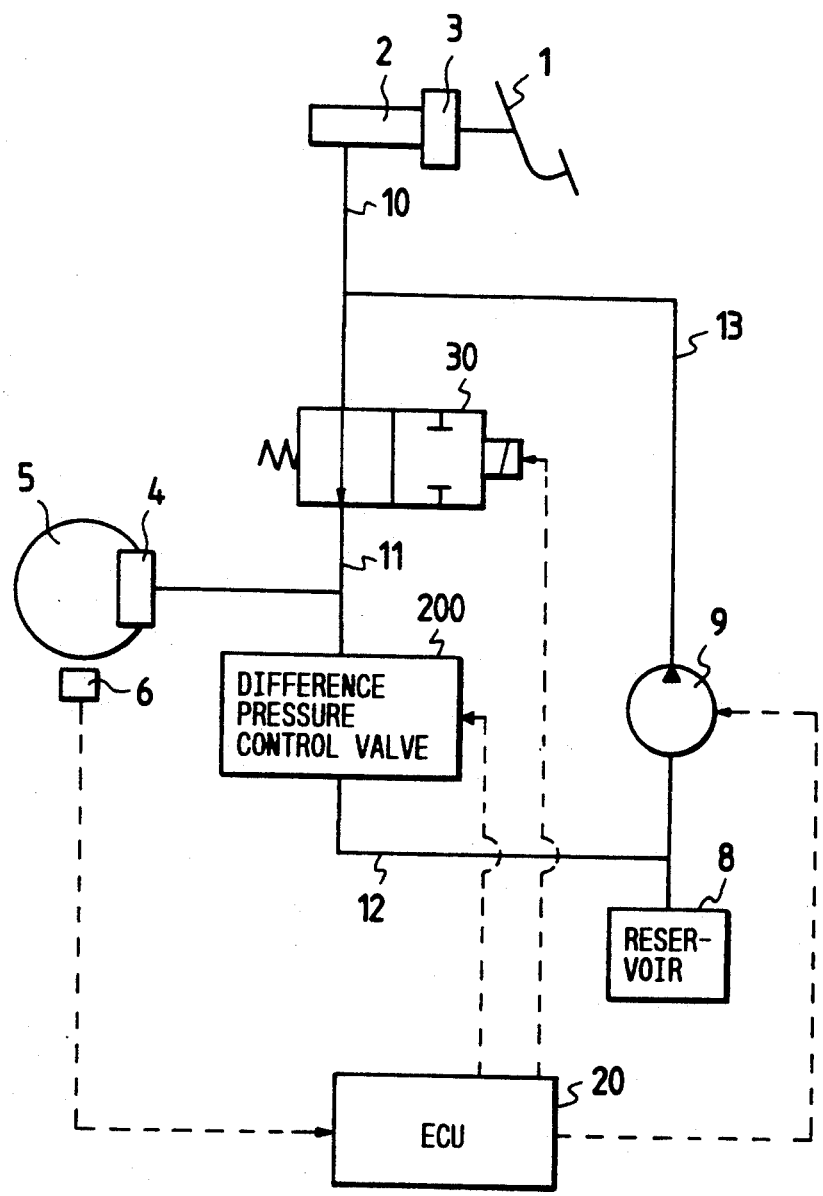
FIG. 8 is a diagram of a braking pressure control apparatus according to a second embodiment of this invention.

With reference to FIG. 8, a hydraulic master cylinder 2 is activated in response to a brake pedal 1 via a brake booster 3. The master cylinder 2 is connected to an electromagnetic change valve 30 and the outlet of an electric pump 9 via pipes 10 and 13. The pump 9 serves to generate a hydraulic pressure. The change valve 30 is connected to a hydraulic wheel cylinder 4 within a brake unit and a difference pressure control electromagnetic valve 200 via pipes 11. The wheel cylinder 4 is associated with a vehicle wheel 5. The difference pressure control valve 200 is connected to a reservoir 8 via a pipe 12. The inlet of the pump 9 is also connected to the reservoir 8.

When the change valve 30 is open, the pressures developed by the master cylinder 2 and the pump 9 are transmitted to the wheel cylinder 4 so that the braking pressure applied to the wheel cylinder 4 can increase. When the change valve 30 is closed, the transmission of the pressures from the master cylinder 2 and the pump 9 to the wheel cylinder 4 is inhibited so that the braking pressure applied to the wheel cylinder 4 can decrease or remain essentially fixed. When the difference pressure control valve 200 is open, brake fluid escapes from the wheel cylinder 4 toward the reservoir 8 so that the braking pressure applied to the wheel cylinder 4 can decrease. When the difference pressure control valve 200 is closed, the escape of the brake fluid from the wheel cylinder 4 toward the reservoir 8 is inhibited so that the braking pressure applied to the wheel cylinder 4 can remain essentially fixed. In this way, the braking pressure applied to the wheel cylinder 4 can be adjusted by the change valve 30 and the difference pressure control valve 200.

The difference pressure control valve 200 is of such a type that the pressure across the valve 200 is continuously varied in accordance with the level of a drive current fed to the valve 200. The difference pressure control valve 200 is normally closed. On the other hand, the change valve 30 is of an ON-OFF type, being changeable between a closed position and an open position. In addition, the change valve 30 is normally open. As will be explained later, under certain conditions, the change valve 30 is driven by a pulse current having a variable duty cycle. From the viewpoint of a time average, the degree of opening of the change valve 30 is varied in accordance with the duty cycle of the drive pulse current. Thus, the braking pressure applied to the wheel cylinder 4 can be continuously varied in accordance with the level of the drive current to the difference pressure control valve 200 and the duty cycle of the drive pulse current to the change valve 30. Specifically, the electromagnetic valve 30 serves to control the difference $\Delta P$ between a master cylinder pressure PM and a wheel cylinder pressure PW, where the master cylinder pressure PM is defined as the resultant of the pressures developed by the master cylinder 2 and the pump 9, and the wheel cylinder pressure PW is defined as a pressure applied to the wheel cylinder 4 (the braking pressure applied to the wheel cylinder 4).

A speed sensor 6 associated with the vehicle wheel 5 senses the rotational speed of the vehicle wheel 5. The speed sensor 6 is electrically connected to an electronic control unit (ECU) 20 so that a vehicle wheel speed signal is outputted from the speed sensor 6 to the ECU 20. The ECU 20 detects lock conditions of the vehicle wheel 5 on the basis of the wheel speed signal. The ECU 20 is electrically connected to the difference pressure control valve 200, the change valve 30, and the pump 9. The ECU 20 generates drive signals for the difference pressure control valve 200, the change valve 30, and the pump 9 in response to the detected lock conditions of the vehicle wheel 5. The generated drive signals are fed from the ECU 20 to the difference pressure control valve 200, the change valve 30, and the pump 9 respectively.

It should be noted that FIG. 8 shows only one vehicle wheel, and there are three other vehicle wheels in the case of a 4-wheel vehicle. A given part of the arrangement of FIG. 8 is also provided for each of the other vehicle wheels. Thus, the control of the braking pressure is executed for each of the vehicle wheels.

Figure 9:
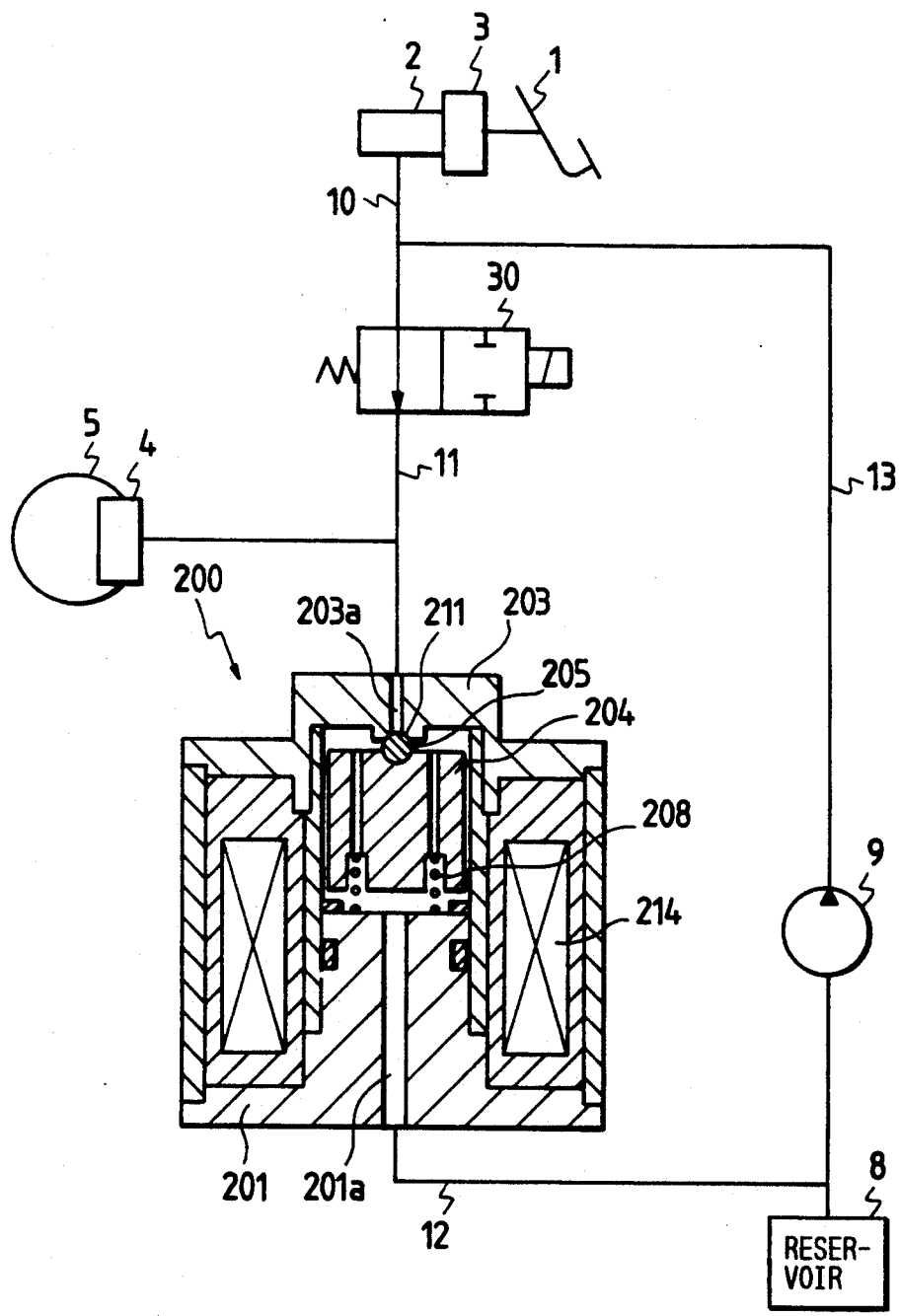
FIG. 9 is a diagram including a sectional view of the difference pressure control valve of FIG. 8.

As shown in FIG. 9, the difference pressure control valve 200 includes a core 201, a plate 203, an armature 204, and a winding 214. The armature 204 is movably located between the plate 203 and the core 201. The plate 203 has a passage 203a leading from the pipe 11. The plate 203 has a valve seat 211 at an inner end of the passage 203a. A valve ball 205 fixed on the armature 204 is normally in contact with the valve seat 211 so that the difference pressure control valve 200 is normally closed. The core 201 has a passage 201a leading to the pipe 12. When the valve ball 205 contacts with the valve seat 211, the communication between the passages 203a and 201a is blocked. When the valve ball 205 separates from the valve seat 211, the communication between the passages 203a and 201a is established. A return spring 208 urges the armature 204 in the direction of moving the valve ball 205 toward the valve seat 211. When the winding 214 is energized, the armature 204 is moved toward the core 201 so that the valve ball 205 separates from the valve seat 211. As a result, the difference pressure control valve 200 is opened. When the winding 214 is de-energized, the armature 204 is moved by the return spring 208 toward the plate 203 so that the valve ball 205 contacts with the valve seat 211. As a result, the difference pressure control valve 200 is closed.

During a normal braking process, the ECU 20 does not output any active drive signals to the difference pressure control valve 200 and the change valve 30. Therefore, the change valve 30 remains opened so that the master cylinder 2, the pump 9, and the wheel cylinder 4 are in full communication with each other. In addition, the difference pressure control valve 200 remains in its closed position so that the communication between the wheel cylinder 4 and the reservoir 8 keeps blocked. In this case, the master cylinder pressure PM, which is generated in response to the depression of the brake pedal 1, is transmitted to the wheel cylinder 4 via the pipe 10, the change valve 30, and the pipe 11 without undergoing an damping effect in the change valve 30. During the normal braking process, the wheel cylinder pressure PW exerts a force on the armature 204 of the difference pressure control valve 200 in the direction of separating the valve ball 205 from the valve seat 211. The force of the return spring 208 is designed so as to hold the valve ball 205 in contact with the valve seat 211 regardless of the wheel cylinder pressure force even in such a case. For example, the force of the return spring 208 is chosen so that the valve ball 205 can be held in contact with the valve seat 211 when the wheel cylinder pressure PW rises to 250 kgt/cm$^2$. Thus, during the normal braking process, it is possible to prevent the escape of the brake fluid from the wheel cylinder 4 toward the reservoir 8 via the difference pressure control valve 200.

When the degree of the lock of the vehicle wheel 5 increases as a result of the braking process, the ECU 20 starts an antiskid control process. During the antiskid control process, the ECU 20 operates to adjust the wheel cylinder pressure PW by controlling the difference pressure control valve 200 and the change valve 30.

During the antiskid control process, when the wheel cylinder pressure PW is required to be decreased or held constant, the ECU 20 energizes the change valve 30 and thus closes the change valve 30 so that the communication of the wheel cylinder 4 with the master cylinder 2 and the pump 9 is blocked. In addition, the ECU 20 feeds a pulse drive current to the difference pressure control valve 200 to adjust the wheel cylinder pressure PW.

Figure 10:
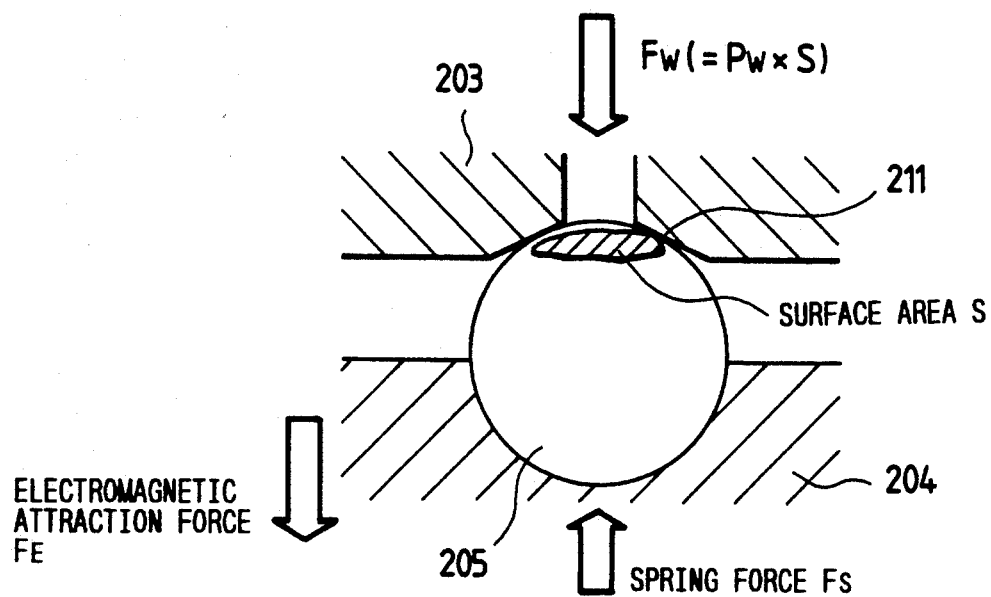
FIG. 10 is a sectional view of a part of the difference pressure control valve of FIG. 9.

A detailed description will be given of the operation of the difference pressure control valve 200 with reference to FIG. 10. When the winding 214 within the difference pressure control valve 200 is supplied with a drive current from the ECU 20 so that the winding 214 is energized, an electromagnetic attraction force FE is generated in the direction of moving the valve ball 205 on the armature 204 away from the valve seat 211 on the plate 203 as shown in FIG. 10. The armature 204 is subjected to two forces FS and FW other than the electromagnetic attraction force FE as shown in FIG. 10. The first force FS is exerted by the return spring 208 in the direction of moving the valve ball 205 toward the valve seat 211. The second force FW is caused by the wheel cylinder pressure PW in the direction of moving the valve ball 205 away from the valve seat 211. The second force FW is given as FW=PW×S, where S denotes the area of the part of the valve seat 211 which is subjected to the wheel cylinder pressure PW when the valve ball 211 contacts with the valve seat 211.

When the forces FE, FS, and FW exerted on the armature 204 balance, the relation among the forces FE, FS, and FW is given as the following equation.

$$FW + FE = FS \tag{3}$$

By referring to the equation (3) and the relation between the force FW and the wheel cylinder pressure PW, the wheel cylinder pressure PW is given by the following equation.

$$PW = (FS - FE)/S \tag{4}$$

Figure 11:
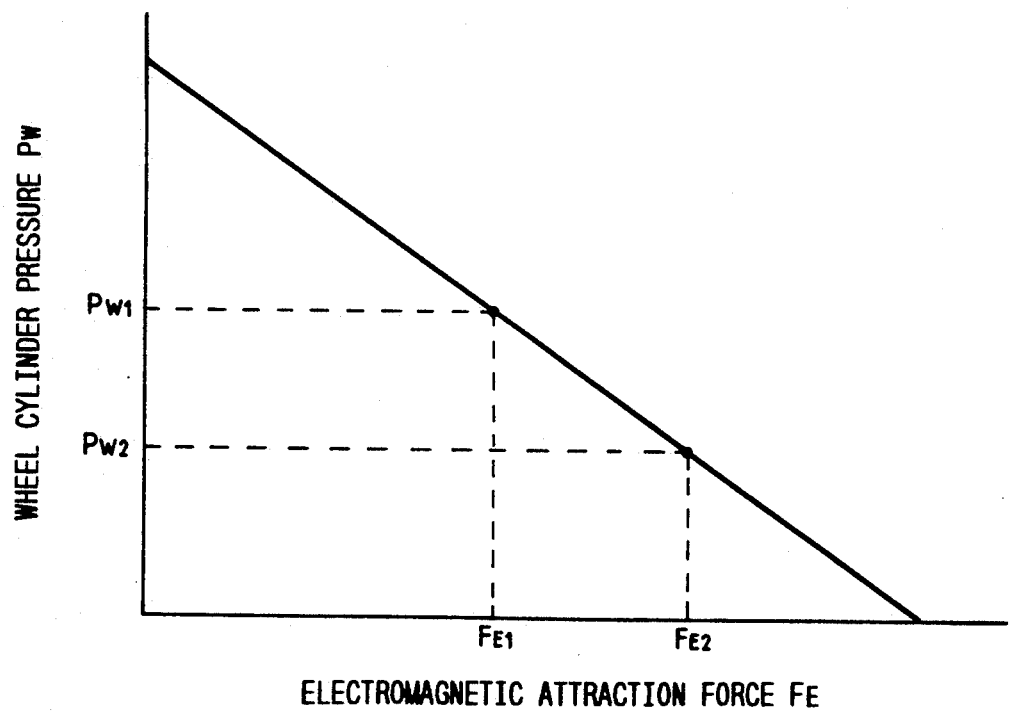
FIG. 11 is a diagram showing characteristics of the difference pressure control valve of FIGS. 8 and 9.

Since the spring force FS and the valve seat area S are constant, it is understood from the equation (4) that the wheel cylinder pressure PW can be continuously varied in accordance with the electromagnetic attraction force FE as shown in FIG. 11. The electromagnetic attraction force FE is proportional to the drive current fed to the winding 214. Thus, the wheel cylinder pressure PW can be continuously adjusted by controlling the level of the drive current to the winding 214.

The difference pressure control valve 200 functions to adjust the difference between the wheel cylinder pressure PW and the pressure within the reservoir 8. Since the pressure within the reservoir 8 is approximately zero, the difference pressure control valve 200 substantially functions to adjust the absolute value of the wheel cylinder pressure PW.

Figure 12:
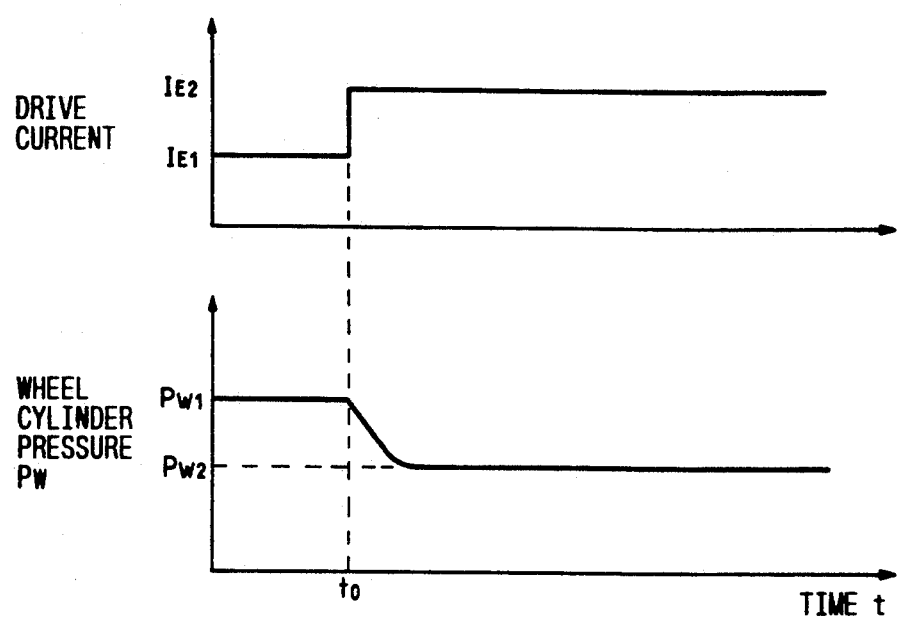
FIG. 12 is a timing chart showing variations in a drive current and pressures related to the difference pressure control valve of FIGS. 8 and 9.

A description will be given of a decrease in the braking pressure which is executed during the antiskid control process. It is now assumed that the wheel cylinder pressure PW is equal to a value PW1 when the drive current to the winding 214 of the difference pressure control valve 200 assumes a level IE1 and thus the electromagnetic attraction force FE equals a value FE1 as shown in FIG. 11. A consideration will now be given of the case where the drive current is increased from the level IE1 to a level IE2 so that the electromagnetic attraction force FE is enhanced from the value FE1 to a value FE2 at a moment t0 as shown in FIG. 12. The increase in the level of the drive current unbalances the forces FE, FS, and FW exerted on the armature 204, so that the resultant force urging the armature 204 away from the valve seat 211 becomes dominant. As a result, the valve ball 205 separates from the valve seat 211, and the difference pressure control valve 200 is opened. Thus, the brake fluid escapes from the wheel cylinder 4 toward the reservoir 8 via the difference pressure control valve 200 so that the wheel cylinder pressure PW drops as shown in FIG. 12. As the wheel cylinder pressure PW drops, the related force FW is weaker. When the wheel cylinder pressure PW reaches a value PW2 corresponding to the electromagnetic attraction force FE2 (see FIG. 11), the forces FE, FS, and FW exerted on the armature 204 balance and the valve ball 205 is moved into contact with the valve seat 211. Thus, the difference pressure control valve 200 is closed, and the wheel cylinder pressure PW is held at the valve PW2.

The spring constant of the return spring 208 is chosen so as to be greater than the rate of a variation in the electromagnetic attraction force FE with respect to the stroke of the armature 204. Therefore, in the case where the wheel cylinder pressure PW moves toward the level PW2 corresponding to the electromagnetic attraction force FE2, the valve ball 205 moves toward the valve seat 211 at a slower rate as the wheel cylinder pressure PW is closer to the level PW2. As a result, the degree of opening of the difference pressure control valve 200 which is determined by the spacing between the valve ball 205 and the valve seat 211 is gradually decreased, and the wheel cylinder pressure PW is smoothly decreased as shown in FIG. 12.

As described previously, the ECU 20 can realize a smooth decrease in the wheel cylinder pressure PW by increasing the drive current IE to the difference pressure control valve 200 while keeping the change valve 30 energized. The degree or magnitude of this decrease in the wheel cylinder pressure PW can be finely or greatly adjusted by controlling the drive current IE to the difference pressure control valve 200.

During the antiskid control process, when the wheel cylinder pressure PW is required to remain constant, the ECU 20 energizes the change valve 30 and keeps constant the drive current IE to the difference pressure control valve 200.

Figure 13:
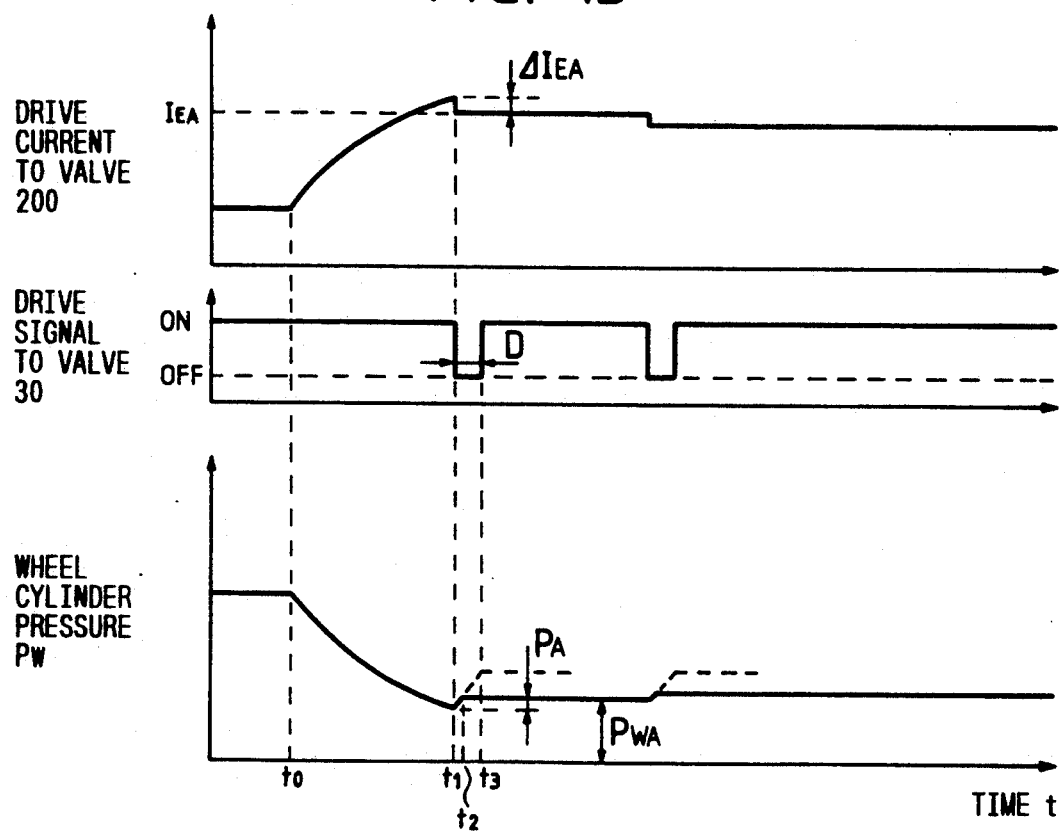
FIG. 13 is a timing chart showing variations in a drive current to the difference pressure control valve, a drive signal to the change valve, and a wheel cylinder pressure in the apparatus of FIG. 8.

A description will be given of a small increase in the wheel cylinder pressure PW which is executed during the antiskid control process. During the antiskid control process, when a small increase in the wheel cylinder pressure PW is required, the ECU 20 decreases the drive current IE to the difference pressure control valve 200 and feeds a pulse drive current to the change valve 30. A further description will be given with reference to FIG. 13. It is now assumed that the drive current IE to the difference pressure control valve 200 remains fixed and also the wheel cylinder pressure PW keeps constant until a moment t0 as shown in FIG. 13. In addition, during an interval between the moment t0 and a moment t1, the ECU 20 increases the drive current IE to the difference pressure control valve 200 so that the wheel cylinder pressure PW smoothly drops as shown in FIG. 13. In the case where the wheel cylinder pressure PW is required to be increased by a pressure PA at the moment t1, the ECU 20 decreases the drive current IE to the difference pressure control valve 200 by a value $\Delta$IEA corresponding to the pressure PA and also starts to de-energize the change valve 30. As shown in FIG. 13, during an interval between the moment t1 and t3, the ECU 20 supplies a negative pulse of the drive current to the change valve 30 and thus continues to de-energize the change valve 30, so that the change valve 30 is kept open. Thus, the brake fluid moves into the wheel cylinder 4 via the change valve 30, and the wheel cylinder pressure PW rises. At a moment t2 between the moments t1 and t3, the wheel cylinder pressure PW rises to a level PWA which is higher than the last minimal level by the pressure PA, and the increase in the wheel cylinder pressure PW is completed. At the moment t3, the ECU 20 starts to feed a positive pulse of the drive current to the change valve 30. During the interval between the moments t2 and t3, if the brake fluid moves into the wheel cylinder 4 via the change valve 30 and thus the wheel cylinder pressure PW further rises, the difference pressure control valve 200 is opened and the brake fluid escapes from the wheel cylinder 4 toward the reservoir 8 via the difference pressure control valve 200. As a result, such a further increase in the wheel cylinder pressure PW is prevented, and thus the wheel cylinder pressure PW is maintained at the level PWA. In other words, during the interval between the moments t2 and t3, the escape of the brake fluid from the wheel cylinder 4 via the difference pressure control valve 200 and the supply of the brake fluid to the wheel cylinder 4 via the change valve 30 can be performed simultaneously. Since the flow of the brake fluid which results from the simultaneous execution of the escape of the brake fluid from the wheel cylinder 4 and the supply of the brake fluid to the wheel cylinder 4 is essentially useless for positive adjustment of the wheel cylinder pressure PW, it is preferable that the interval between the moments t2 and t3 is short. Specifically, it is preferable that the width D (see FIG. 13) of a negative pulse of the drive current to the change valve 30 or the duration of the temporary de-energization of the change valve 30 is slightly longer than the interval between the moments t1 and t2 which is spent to increase the wheel cylinder pressure PW by the value PA.

During the antiskid control process, when a rapid and great increase in the wheel cylinder pressure PW is required, the ECU 20 greatly decreases the drive current IE to the difference pressure control valve 200 and feeds a pulse drive current to the change valve 30. In this case, the width of a pulse of the drive current to the change valve 30 is set relatively large.

DESCRIPTION OF THE THIRD PREFERRED EMBODIMENT

Figure 14:
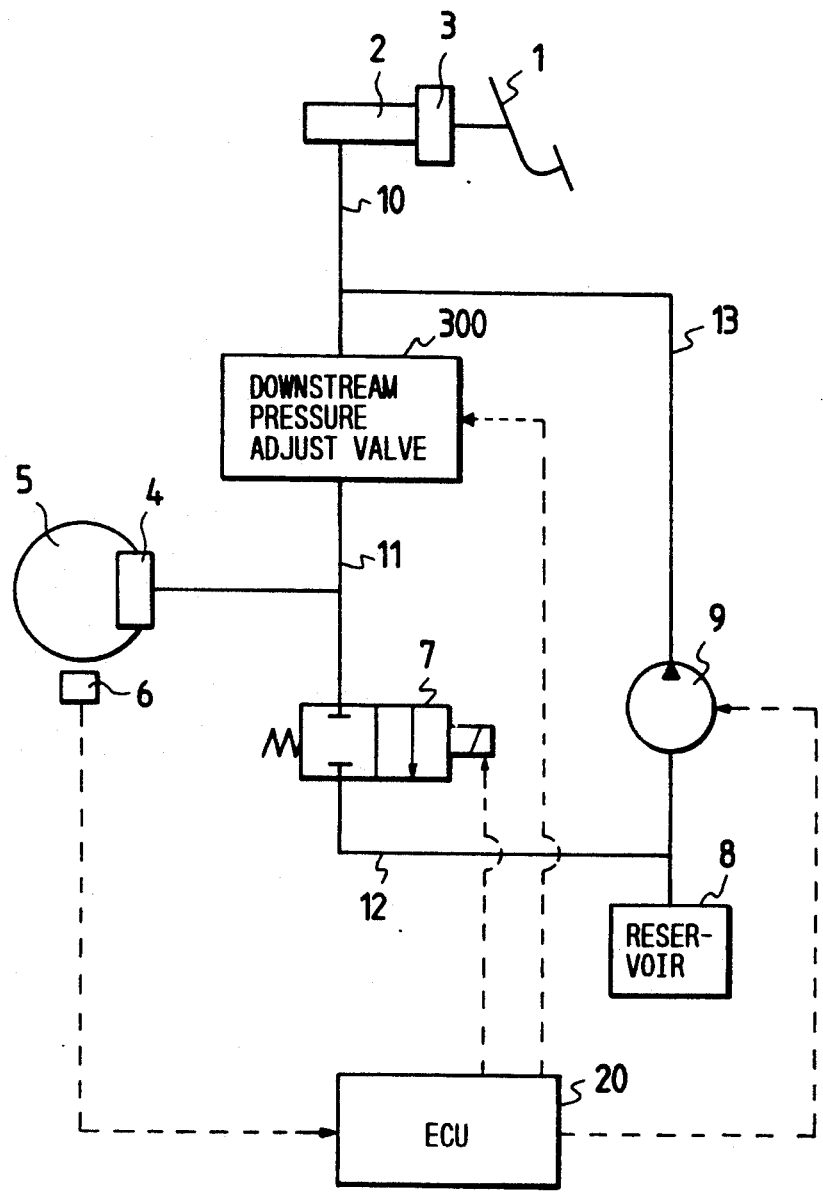
FIG. 14 is a diagram of a braking pressure control apparatus according to a third embodiment of this invention.

FIG. 14 shows a third embodiment of this invention which is similar to the embodiment of FIGS. 1-7 except for the following design changes. The embodiment of FIG. 14 uses a downstream pressure adjustment electromagnetic valve 300 in place of the difference pressure control valve 100 (see FIG. 1).

Figure 15:
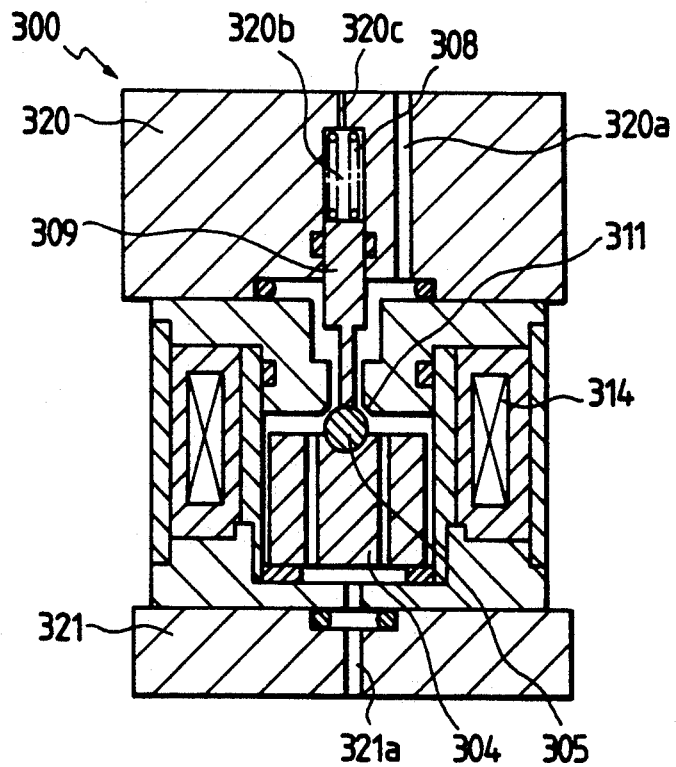
FIG. 15 is a sectional view of the downstream pressure adjustment valve of FIG. 14.
Figure 16:
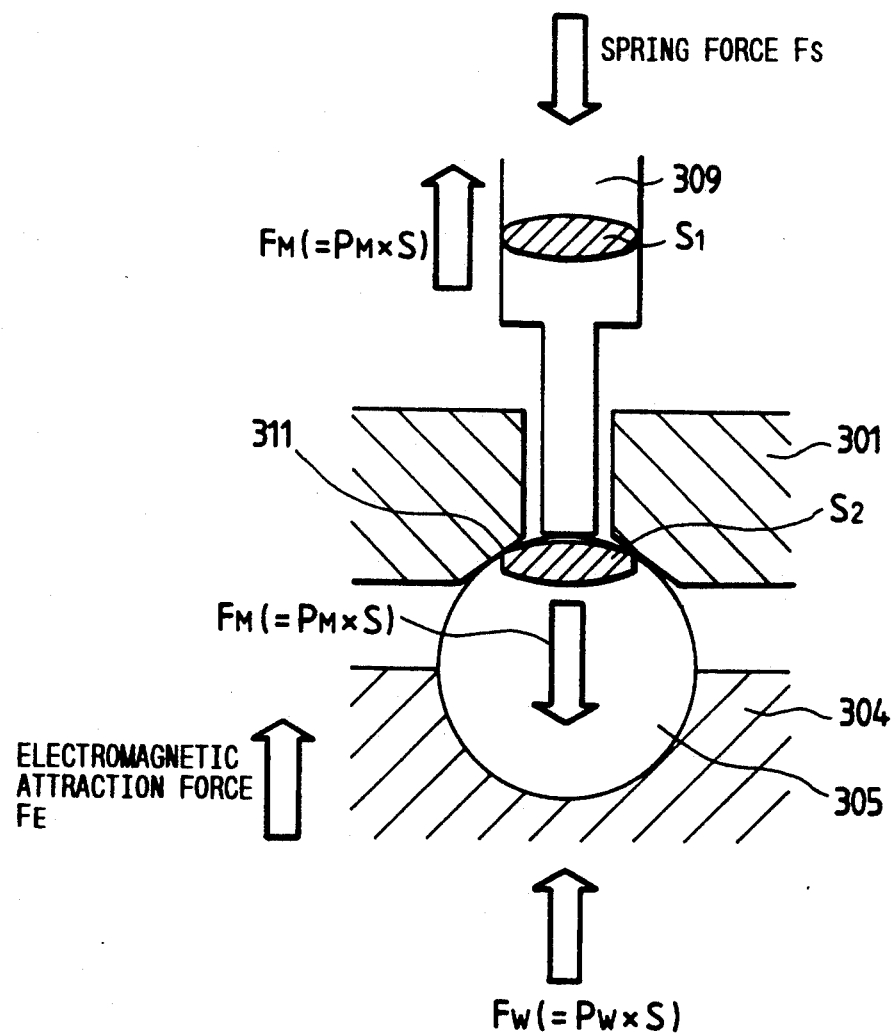
FIG. 16 is a sectional view of a part of the downstream difference pressure adjustment valve of FIG. 15.

As shown in FIG. 15, the downstream pressure adjustment valve 300 includes a housing having a first end 320 and a second end 321. The first end 320 of the housing has a passage 320a leading from a pipe 10 (see FIG. 14). The second end 321 of the housing has a passage 321a leading to pipes 11 (see FIG. 14). As will be explained later, the passages 320a and 321a can be selectively moved into and out of communication with each other. A spool 309 is slidably supported on the first end 320 of the housing. An end of the spool 309 contacts with a valve ball 305 fixed to an armature 304. The other end of the spool 309 engages a spring 308 so that the spool 309 is urged by the spring 308. The first end 320 of the housing has a chamber 320b accommodating the spring 308. The chamber 320b opens into the atmosphere via a passage 320c, so that the chamber 320b is exposed to the atmospheric pressure. The armature 304 receives the force of the spring 308 via the spool 309 and the valve ball 305. The downstream pressure adjustment valve 300 has a valve seat 311 aro9und an internal opening which leads from the passage 320a. The valve ball 305 contacts with and separates from the valve seat 311 in accordance with movement of the armature 304. When the valve ball 305 contacts with the valve seat 311, the communication between the passages 320a and 321a is blocked so that the downstream pressure adjustment valve 300 is closed. When the valve ball 305 separates from the valve seat 311, the communication between the passages 320a and 321a is established so that the downstream pressure adjustment valve 300 is opened. The armature 304 is urged by the spring 308 in the direction of moving the valve ball 305 away from the valve seat 311, so that the downstream pressure adjustment valve 300 is normally open. The armature 304 is moved by energizing and de-energizing a winding 314. The spool 309 has a larger-diameter part and a smaller-diameter part. As shown in FIG. 16, the cross-sectional area S1 of the larger-diameter part of the spool 309 is set equal to a valve seat area S2 which occurs when the valve ball 305 is in contact with the valve seat 311.

During an antiskid control process, when a wheel cylinder pressure PW is required to be increased, an ECU 20 de-energizes a change valve 7 and feeds a drive current to the downstream pressure adjustment valve 300. In this case, the increase in the wheel cylinder pressure PW depends on the level of the drive current to the downstream pressure adjustment valve 300.

A detailed description will be given of the pressure-increasing operation of the downstream pressure control valve 300 with reference to FIG. 16. When the winding 314 within the downstream pressure adjustment valve 300 is supplied with a drive current from the ECU 20 so that the winding 314 is energized, an electromagnetic attraction force FE is generated in the direction of moving the valve ball 305 on the armature 304 toward the valve seat 311 as shown in FIG. 16. The armature 304 is subected to three forces FS, FM, and FW other than the electromagnetic attraction force FE as shown in FIG. 16. The first force FS is exerted by the return spring 308 in the direction of moving the valve ball 305 away from the valve seat 311. The second force FM is caused by a master cylinder pressure PM in the direction of moving the valve ball 305 away from the valve seat 311. The second force FM is given as $FM = PM \times S$, where S denotes the area of the part of the valve seat 311 which is subjected to the master cylinder pressure PM when the valve ball 305 contacts with the valve seat 311. The third force FW is caused by the wheel cylinder pressure PW in the direction of moving the valve ball 305 toward the valve seat 311.

The third force FW is given as $FW = PW \times S$. Since the spool 309 receives a force FM which is caused by the master cylinder pressure PM and which acts in the direction opposite to the direction of the spring force FS, the resultant force which equals the spring force FS minus the master cylinder pressure force FM is transmitted to the armature 304 from the spool 309. In other words, the armature 304 receives the resultant force $FS - FM$ rather than the spring force FS.

When the forces, FE, FS−FM, FM, and FW exerted on the armature 304 balance, the relation among the forces FE, FS−FM, FM, and FW is given as the following equation.

$$FM + (FS - FM) = FW + FE \qquad (5)$$

The equation (5) is transformed into the following equation.

$$FS = FW + FE \qquad (6)$$

By referring to the equation (6) and the relation between the force FW and the wheel cylinder pressure PW, the wheel cylinder pressure PW is given by the following equation.

$$PW = (FS - FE)/S \qquad (7)$$

Figure 17:
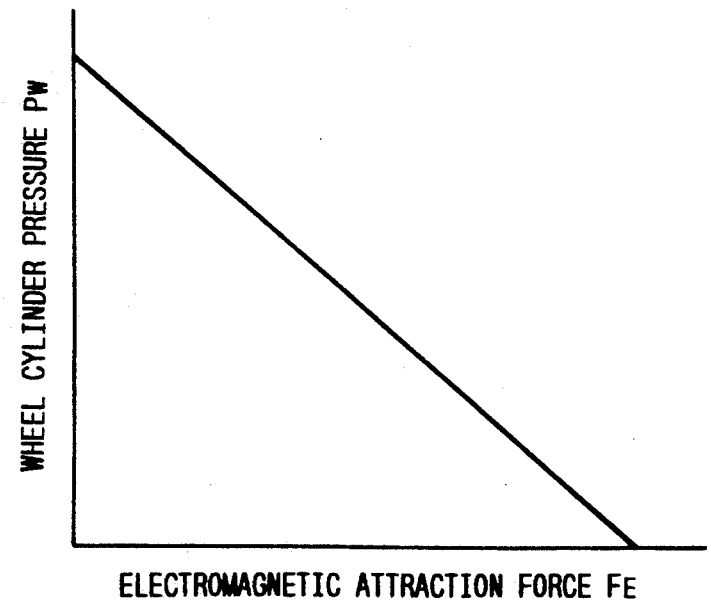
FIG. 17 is a diagram showing characteristics of the downstream pressure adjustment valve of FIGS. 14 and 15.

Thus, the wheel cylinder pressure PW is independent of the master cylinder pressure PM. Since the spring force FS and the valve seat area S are constant, it is understood from the equation (7) that the wheel cylinder pressure PW can be continuously varied in accordance with the electromagnetic attraction force FE as shown in FIG. 17. The electromagnetic attraction force FE is proportional to the drive current fed to the winding 314. Thus, the wheel cylinder pressure PW can be continuously adjusted by controlling the level of the drive current to the winding 314.

During the antiskid control process, when the wheel cylinder pressure PW is required to be decreased or held constant, the ECU 20 controls the downstream pressure adjustment valve 300 and the change valve 7 in a manner similar to the manner of the control of the difference pressure control valve 100 and the change valve 7 in the embodiment of FIGS. 1–7.

DESCRIPTION OF THE FOURTH PREFERRED EMBODIMENT

Figure 18:
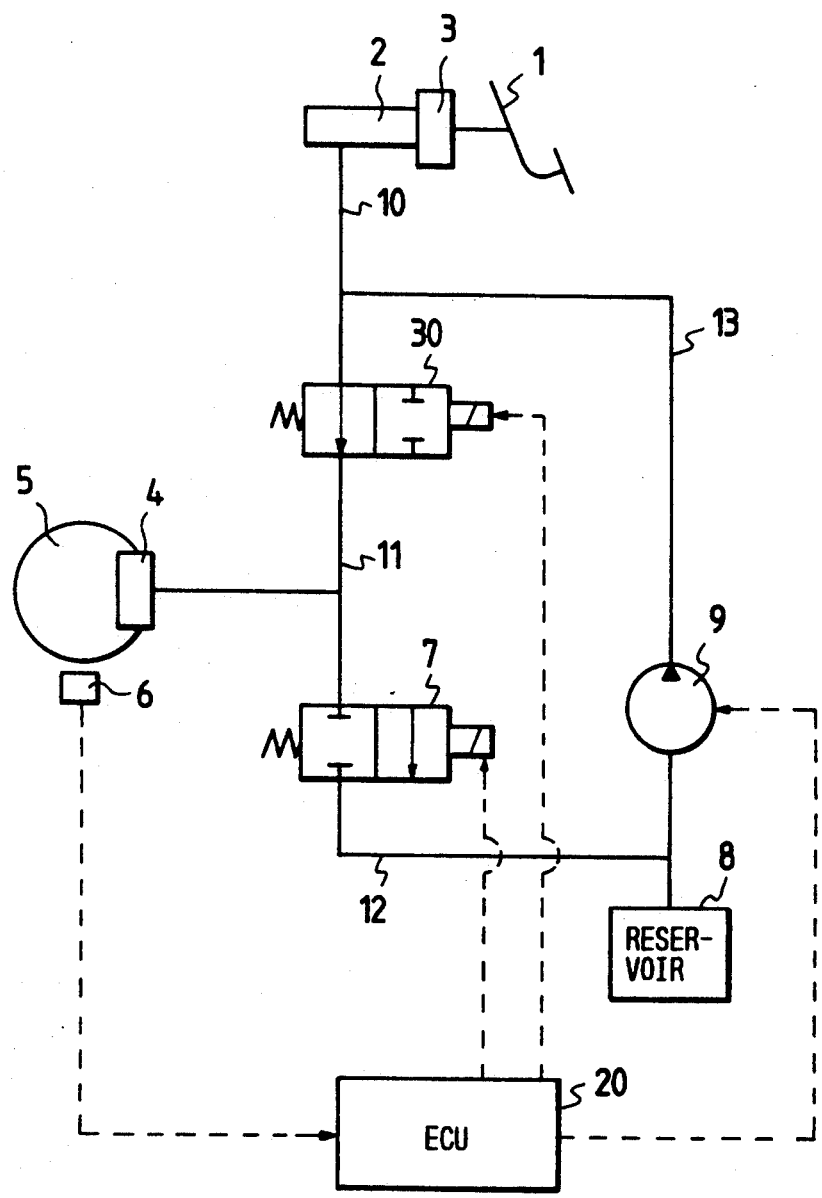
FIG. 18 is a diagram of a braking pressure control apparatus according to a fourth embodiment of this invention.

FIG. 18 shows a fourth embodiment of this invention which is similar to the embodiment of FIGS. 1–7 except for the following design changes. The embodiment of FIG. 18 uses an electromagnetic change valve 30 in place of the difference pressure control valve 100 (see FIG. 1). The change valve 30 is of the normally-open type, and has a structure similar to the structure of the change valve 30 in the embodiment of FIGS. 8–13.

During an antiskid control process, when an increase in a wheel cylinder pressure PW is required, an ECU 20 basically de-energizes an electromagnetic change valve 7 and the electromagnetic change valve 30 so that the change valve 7 is closed but the change valve 30 is open. When the wheel cylinder pressure PW is required to remain constant, the ECU 20 energizes the change valve 30 but de-energizes the change valve 7 so that both of the change valves 30 and 7 are closed. When a normal decrease in the wheel cylinder pressure PW is required, the ECU 20 energizes the change valves 30 and 7 so that the change valve 30 is closed but the change valve 7 is open.

During the antiskid control process, in the case where a small variation in the wheel cylinder pressure PW is required, the ECU 20 de-energizes the change valve 30 for a first short interval but energizes the change valve 7 for a second short interval. As a result, the change valve 30 is open for the first short interval, and the change valve 7 is open for the second short interval. Thus, during a third short interval corresponding to the overlap between the first and second short intervals, both of the change valves 30 and 7 are open so that the supply of brake fluid to a wheel cylinder 4 via the change valve 30 and the escape of the brake fluid from the wheel cylinder 4 via the change valve 7 are simultaneously performed. Specifically, the first short interval and the second short interval are set different from each other in response to the degree or magnitude of the required variation in the wheel cylinder pressure PW so that the actual wheel cylinder pressure PW can be varied in accordance with required variation in the wheel cylinder pressure PW. For example, in the case where the first short interval is 3 msec and the second short interval is 4 msec, the wheel cylinder pressure PW is decreased by a value corresponding to 1 msec. In this way, a small variation in the wheel cylinder pressure PW is executed.

DESCRIPTION OF THE FIFTH PREFERRED EMBODIMENT

Figure 19:
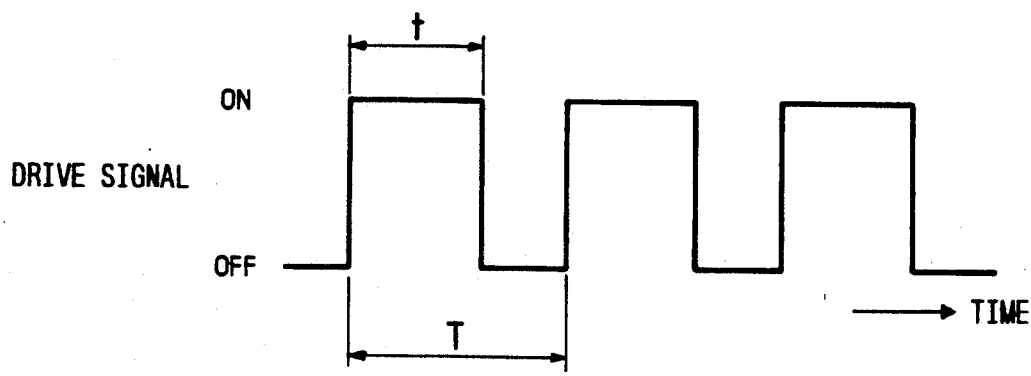
FIG. 19 is a diagram showing the waveform of a drive signal to a difference pressure control valve in a braking pressure control apparatus according to a fifth embodiment of this invention.

A fifth embodiment of this invention is similar to the embodiment of FIGS. 1-7 except for the following design change. In the fifth embodiment, a drive signal fed from an ECU 20 to a difference pressure control valve 100 is a pulse signal which has a duty cycle t/T such as shown in FIG. 19. For example, the period T is chosen to be in the range of 1 msec to 100 msec.

OTHER PREFERRED EMBODIMENTS

Other embodiments of this invention are similar to the previously-mentioned embodiments except that they are applied to open-loop type antiskid control apparatuses, traction control apparatuses, or braking force distributing apparatuses.

What is claimed is:

1. In a vehicle brake control system including means for detecting a running condition of a vehicle, a wheel cylinder, and means for controlling a braking pressure in the wheel cylinder in response to the detected running condition of the vehicle, a braking pressure control apparatus comprising:
   a hydraulic pressure source;
   a first electromagnetic valve, changeable between a closed state and an open state, connected between the hydraulic pressure source and the wheel cylinder for controlling a supply of brake fluid to the wheel cylinder from the hydraulic pressure source;
   a reservoir;
   a second electromagnetic valve, changeable between a closed state and an open state, connected between the wheel cylinder and the reservoir for controlling the escape of brake fluid from the wheel cylinder toward the reservoir; and
   control means for outputting control signals for independently controlling the first and second valves, respectively, so as to control the braking pressure in the wheel cylinder by controlling supply to and escape from the wheel cylinder of brake fluid, where the control means comprises deciding means for determining whether the wheel cylinder braking pressure should be varied on the basis of the running condition, and means for independently controlling the valves such that one valve is placed in an open state at a time when the other valve is already in an open state and remains in the open state until a target wheel cylinder pressure is attained, thereby providing fine adjustment of the braking pressure by the simultaneous supply of brake fluid to the wheel cylinder and escape of brake fluid from the wheel cylinder.

2. In a vehicle brake control system including means for detecting a running condition of a vehicle, a wheel cylinder, and means for controlling a braking pressure in the wheel cylinder in response to the detected running condition of the vehicle, a braking pressure control apparatus comprising:
   a hydraulic pressure source;
   a first electromagnetic valve, changeable between a closed state and an open state, connected between the hydraulic pressure source and the wheel cylinder for controlling a supply of brake fluid to the wheel cylinder from the hydraulic pressure source;
   a reservoir;
   a second electromagnetic valve, changeable between a closed state and an open state, connected between the wheel cylinder and the reservoir for controlling the escape of brake fluid from the wheel cylinder toward the reservoir; and
   control means for outputting control signals for independently controlling the first and second valves, respectively, so as to control the braking pressure in the wheel cylinder by controlling a supply of brake fluid to the wheel cylinder and an escape of brake fluid from the wheel cylinder, where the control means comprises deciding means for determining whether the wheel cylinder braking pressure should be varied on the basis of the running condition, and means for independently controlling the valves so as to allow one valve to be placed in an open state at a time when the other valve is already in an open state, thereby allowing fine adjustment of the braking pressure by the simultaneous supply of brake fluid to the wheel cylinder and escape of brake fluid from the wheel cylinder;
   wherein one of said first and second electromagnetic valves is a proportional electromagnetic valve which is changeable between a closed state and an open state, said proportional electromagnetic valve controlling a brake fluid pressure by creating a variable resistance force as part of a valve action, said force being balanced by forces created by the brake fluid pressure, thereby permitting continuous adjustment of an amount of brake fluid pressure needed to initiate a change in the state of the proportional electromagnetic valve, allowing for smooth transitions and fine adjustments of the braking pressure in the wheel cylinder.

3. The braking pressure control apparatus of claim 2 wherein the proportional electromagnetic valve comprises:
   a housing;
   a valve seat extending in the housing;
   a valve member located in correspondence with the valve seat for blocking a communication between an incoming side and an outgoing side when being seated on the valve seat;

a spring for urging the valve member in a direction of seating the valve member on the valve seat; and means for exerting an electromagnetic force, which is adjustable over a range of magnitudes, on the valve member in a direction opposite to a direction of urging the valve member by the spring, a spring constant of which is set greater than a rate of a variation in the electromagnetic force with respect to a displacement of the valve member.

4. The braking pressure control apparatus of claim 2 wherein the control means comprises means for varying a level of a current of the control signal to the proportional electromagnetic valve in order to adjust the variable resistance force.

5. The braking pressure control apparatus of claim 2 wherein the control means comprises means for pulse driving said electromagnetic valve which is changeable between a closed and open state.

6. The braking pressure control apparatus of claim 2 wherein the first valve is said proportional electromagnetic valve comprising a difference pressure control valve and the second valve comprises the electromagnetic valve which is changeable between a closed and open state.

7. The braking pressure control apparatus of claim 2 wherein the first valve is said electromagnetic valve, which is changeable between the closed and open state, and the second valve is a proportional electromagnetic valve comprised of a difference pressure control valve.

* * * * *